United States Patent [19]

Shen et al.

[11] Patent Number: 4,659,217

[45] Date of Patent: Apr. 21, 1987

[54] DETERMINING SPLICE ATTENUATION

[75] Inventors: Nelson M. Shen, San Jose; John P. Arrington, San Mateo, both of Calif.

[73] Assignee: Raychem Corp., Menlo Park, Calif.

[21] Appl. No.: 755,408

[22] Filed: Jul. 15, 1985

[51] Int. Cl.⁴ .................... G01N 21/01; G01N 21/59
[52] U.S. Cl. .................................................. 356/73.1
[58] Field of Search ....................................... 356/73.1

[56] References Cited

PUBLICATIONS

Cocito et al. "Fibre to Fibre Coupling with Three Different Fibre Core Diameters" Cselt Rapporti Tecnici, vol. VI, N2 Giugno 1978, pp. 113–119.

Primary Examiner—Vincent P. McGraw
Attorney, Agent, or Firm—Dennis E. Kovach; Herbert G. Burkard

[57] ABSTRACT

A method and apparatus for determining a dB loss across an optical fiber splice includes the steps of determining a first maximum detected optical signal when the fiber ends are moved relative to each other in a X direction, determining a second maximum optical signal when the fiber ends are moved relative to each other in a Y direction, determining a third optical signal when the fiber ends are optimally substantially aligned, determining a fourth optical signal when subsequent to the fiber ends actually being secured to each other.

11 Claims, 1 Drawing Figure

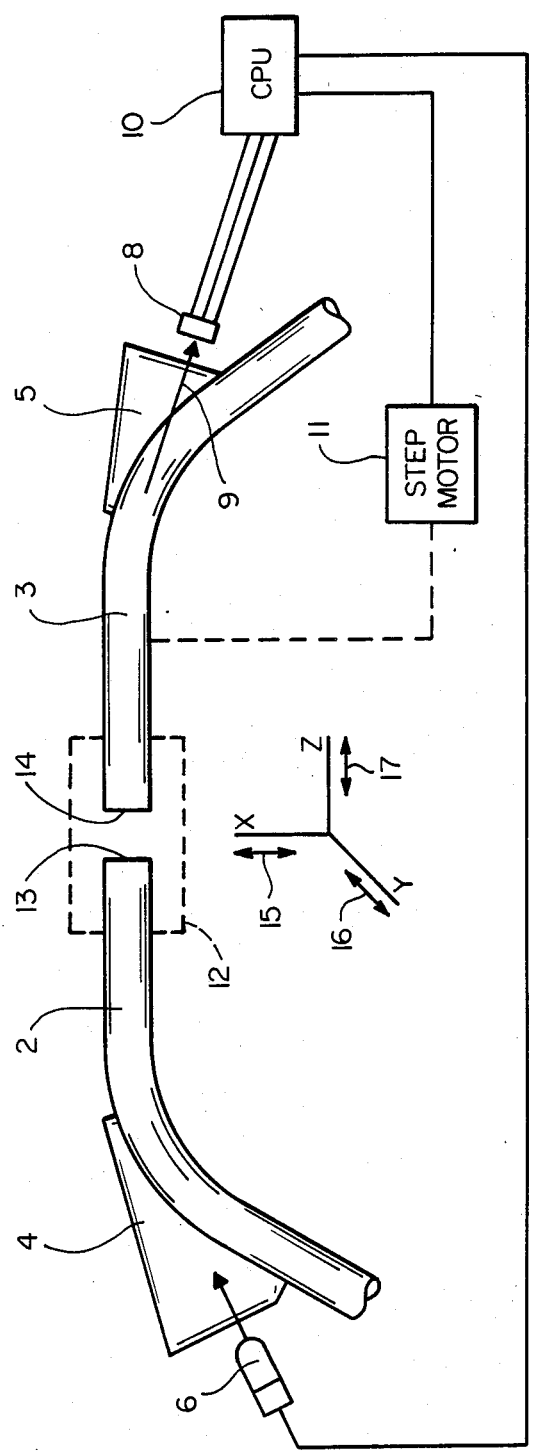
FIG_1

DETERMINING SPLICE ATTENUATION

BACKGROUND OF THE INVENTION

The present invention is related to copending U.S. Ser. Nos. 545,413 filed Oct. 25, 1983, now U.S. Pat. No. 4,629,316 and 630,921 filed July 16, 1984, now U.S. Pat. No. 4,634,274, assigned to the assigned of the present invention, the disclosures of which are incorporated herein by reference.

The present invention relates to a method and apparatus for measuring a loss across an optical fiber splice joining first and second optical fibers.

A common prior art method of determining a signal loss across an optical fiber splice is to utilize an optical time domain reflectometer (OTDR) subsequent to formation of the splice. However, the use of an OTDR is disadvantageous since it is a relatively expensive piece of equipment to be made available for such a limited purpose, and its use requires that an OTDR operator be made available at a signal injection/signal extraction point of an optical fiber, usually a termination thereof, located usually remotely from the splice.

SUMMARY OF THE INVENTION

It is an object of the present invention to eliminate the above noted drawbacks and to provide a method and apparatus for locally determining an attenuation across an optical fiber splice subsequent to forming the splice, the method comprising the steps of moving first and second ends of first and second fibers relative to each other in an X and a Y direction, detecting intensities of light in the second downstream fiber as the fiber ends are moved, detecting a first maximum intensity of light as the fiber ends are moved in the X direction, detecting a second maximum intensity of light as the fibers are moved in the Y direction, detected a third intensity of light after the fiber ends are optimally substantially aligned and the moving means has stopped moving the first and second fiber ends relative to one another, securing the first and second ends subsequent to stopping the moving means, detecting a fourth intensity of light subsequent to securing the first and second fiber ends together, determining an attenuation loss caused by an optical fiber splice formed by securing the first and second ends together by using the first and second maximum intensities and the third and fourth intensities.

The optical fibers can be secured in any manner, preferred manners being fusing the optical fiber ends together or alternatively glueing the optical fiber ends together by curing a liquid adhesive within which the fiber ends are moved. The loss is preferentially illustrated as a dB loss and is determined by summing three values, a first value being reflective of an X misalignment, the second value being reflective of a Y misalignment, and the third value being reflective of loss formed by the securing operation.

BRIEF DESCRIPTION OF THE DRAWINGS

FIG. 1 is a schematic illustration of a method and apparatus constructed according to one preferred embodiment of the invention.

DESCRIPTION OF THE PREFERRED EMBODIMENT

FIG. 1 illustrates an apparatus and method for determining a splice loss incurred by joining first and second ends 13, 14 of first and second fibers 2, 3 together. The fiber ends 13, 14 are moved relative to one another in X, Y, and Z directions illustrated by arrows 15, 16, and 17 respectively using a moving means 11, one example being a step motor. Preferentially, light is locally injected into the upstream optical fiber 2 using a side light launch injection technique, one example of which is disclosed in U.S. application Ser. Nos. 437,053, now abandoned, and 614,884, assigned to the assignee of the present invention, the disclosures of which are incorporated herein by reference. Specifically, light is injected into the upstream optical fiber 2 through its buffer at a bend by injecting an optical signal from a light source 6 into an optical coupler 4 and then into the fiber 2 at the bent section thereof. Alternatively, the signal could be injected into the optical fiber 2 at a straight section thereof through its buffer using the source 6 and optical coupler 4 at a straight section of the optical fiber, with the fiber being bent downstream from a point of injection to mode couple light into a core of the optical fiber 2. Light is withdrawn from the downstream optical fiber 3 through its buffer at a bend using another optical coupler 5 and a light detector 8, preferably at a bend as illustrated, though local light detection can be achieved by first bending the downstream optical fiber 3 and then disposing an optical coupler 5 at a straight section of the optical fiber 3 downstream from the bend while using the detector 8. An intensity of an optical signal 9 detected by the detector 8 is transmitted to a microcomputer such as a central processing unit 10 which preferably can also be in communication with the light source 6. Preferably, feedback control is utilized between light intensities detected by the central processing unit 10 and light intensities emitted by the source 6 such that the ends 13, 14 of the first and second optical fibers 2, 3 are optimally aligned so as to maximize detected signal 9 to the extent practicable. Thereafter, the first and second optical fibers 2, 3 are secured to each other, two methods being curing a liquid adhesive surrounding the first and second ends 13, 14, an alternative embodiment being fusing or melting the first and second ends 13, 14 together.

According to the invention, an attenuation across the splice formed by the securing means 12 is determined by utilizing a first maximum signal intensity found when moving the fiber ends 13, 14 relative to each other in the X direction, using a second maximum light intensity found when moving the optical fiber ends 13, 14 relative to each other in the Y direction, using a third optical signal intensity found when the optical fiber ends 13, 14 are optimally substantially aligned by the step motor 11 using the feedback control described, and by using a fourth signal intensity withdrawn from the optical fiber 3 subsequent to securing the first and second fiber ends 13, 14 together.

Specifically, it has been found that due to the extreme small size of optical fibers, and in particular their cores, and due to a finite minimum amount of stepping movement achieveable when moving the fiber ends 13, 14 relative to each other, it is for practical purposes impossible to relocate the exact positions where the third signal intensity is as large as maximum intensities found during the aligning process, and that the difference between the maximum intensities and the final third intensity prior to securing the optical fibers together is indicative of an amount of misalignment of the fiber ends 13, 14 and can be used as a good approximation for estimating an attenuation or loss across a splice. In addition, it has also been found that, subsequent to securing the fiber ends 13, 14 together, changes in alignment occur and accordingly, to achieve better attenuation or loss measurement accuracy, the signal intensity subsequent to permanently joining the ends 13, 14 is utilized in conjunction with the third signal intensity measured subsequent to obtaining optimal substantial alignment prior to actually securing the optical fibers together.

Also, for those embodiments wherein resiliently deformable optical couplers 4, 5 are utilized, it has been found that the detected signal 9 varies in time and generally decreases with time due to creep of the optical couplers 4, 5 when the optical fibers 2, 3 are pressed thereagainst, and a further correction factor can be utilized to compensate for this creep effect, and without such compensation the otherwise measured loss would be erroneously high.

An example of the use of the method and apparatus of the invention is that an attenuation across a splice can be determined by utilizing the following algorithms:

$$dB = dB_x + dB_y + dB_{secure} + dB_{drift} \quad (1)$$

$$dB_x = 10 \log S_3/S_1 \quad (2)$$

$$dB_y = 10 \log S_3/S_2 \quad (3)$$

$$dB_{secure} = 10 \log S_4/S_3 \quad (4)$$

$$dB_{drift} = 10 \log (1/1 - xt) \quad (5)$$

where dB is the attenuation expressed in dB, $dB_x$ is an attenuation caused by an X axis misalignment, $dB_y$ is an attenuation caused by a Y axis misalignment, $dB_{secure}$ is an attenuation caused by the securing operation, $dB_{drift}$ is an attenuation caused by changes in signal intensity created by creep of the optical couplers 4, 5, $S_1$ is a first maximum signal detected when moving the fiber ends 13, 14 in an X direction, $S_2$ is a second maximum signal detected when moving the optical fiber ends 13, 14 in the Y direction, $S_3$ is a third optical signal detected subsequent to optimally substantially aligning the optical fiber ends 13, 14, $S_4$ is a fourth optical signal detected subsequent to securing the optical fiber ends 13, 14 together, x is an emperical factor determined from experimentation, and t is an amount of time beginning immediately after the optical fiber ends 13, 14 have been optimally substantially aligned and ending with a beginning of the securing operation, this being either fusion or plumerization of a liquid curable adhesive. A typical value of x in one example studied was 0.29%.

Though the invention has been described with reference to one preferred embodiment thereof, the invention is not to be limited thereby, and is understood to be limited only by the appended claims.

What is claimed is:

1. A method of determining attenuation across an optical fiber splice between a first fiber and a second fiber, comprising the steps of:
   moving a first end of a first optical fiber and a second end of a second optical fiber relative to each other along an X and a Y axis, the X and Y axes forming a plane substantially perpendicular to a longitudinal axis of at least one of the first and second fibers;
   detecting intensities of light in the second fiber as the first and second fiber ends are moved;
   detecting a first maximum intensity of light as the fiber ends are moved in the X direction;
   detecting a second maximum intensity of light as the fibers are moved in the Y direction;
   detecting a third intensity of light after the fiber ends are optimally substantially aligned and the moving means has stopped moving the first and second fiber ends relative to one another;
   securing the first and second ends together subsequent to stopping the moving means;
   determining a fourth intensity of light subsequent to securing the first and second fiber end together;
   determining an attenuation caused by an optical fiber splice by using the first and second maximum intensities and the third and fourth intensities.

2. The method of claim 1, the attenuation being determined by calculating a first dB loss value based upon the first and third intensities, a second dB loss value based upon the second and third intensities, a third dB loss value based upon the third and fourth intensities, the dB attenuation being a sum of the first, second, and third values.

3. The method of claim 2, the first, second and third values being calculcated as follows:

$$\text{first value} = 10 \log \left( \frac{\text{third intensity}}{\text{first intensity}} \right)$$

$$\text{second value} = 10 \log \left( \frac{\text{third intensity}}{\text{second intensity}} \right)$$

$$\text{third value} = 10 \log \left( \frac{\text{fourth intensity}}{\text{third intensity}} \right).$$

4. The method of claim 1, the first and second optical fiber ends being secured by glueing them together.

5. The method of claim 1, the first and second fiber ends being secured to each other by fusing them together.

6. The method of claim 1, further comprising the step of locally injecting light into the first optical fiber at a bend using a light source and a first optical coupler.

7. The method of claim 1, further comprising the step of detecting the signals by locally withdrawing light from the second optical fiber at a bend using an optical coupler and a light detector.

8. The method of claim 6, further comprising the step of locally detecting light from the second optical fiber at a bend using a second optical coupler and a light detector.

9. The method of claim 6, further comprising the step of compensating for changes in the detected intensities with time created by material creep of the optical coupler.

10. The method of claim 7, further comprising the step of compensating for changes in the detected intensities with time created by material creep of the optical coupler.

11. The method of claim 8, further comprising the step of compensating for changes in the detected intensities with time created by material creep of at least one optical coupler.

* * * * *